United States Patent [19]

Axenko et al.

[11] 4,414,091

[45] Nov. 8, 1983

[54] APPARATUS FOR ELECTROCHEMICAL PURIFICATION OF CONTAMINATED LIQUIDS

[76] Inventors: Alexandr A. Axenko, ulitsa Bairona, 152, kv. 25; Miron M. Nazarian, ulitsa Bljukhera, 13, kv. 138; Vladimir A. Kolyada, ulitsa Petrozavodskaya, 91a, kv. 30; Arkady R. Mataev, ulitsa Timurovtsev, 19, kv. 130; Ljudmila F. Shamsha, ulitsa Dinamovskaya, 3, kv. 23, all of, Kharkov, U.S.S.R.

[21] Appl. No.: 366,444

[22] Filed: Apr. 7, 1982

Related U.S. Application Data

[63] Continuation of Ser. No. 221,245, Dec. 30, 1980, abandoned.

[51] Int. Cl.³ ............................. C25B 9/00; C02F 1/46
[52] U.S. Cl. ..................................... 204/277; 204/149
[58] Field of Search ............................... 204/275-278, 204/149

[56] References Cited

U.S. PATENT DOCUMENTS 3,361,663  1/1968  Murray et al. .................. 204/278
3,706,646  12/1972 Gibson, Jr. et al. ............ 204/277 X
3,925,203  12/1975 Turner ........................... 204/149 X
4,101,409  7/1978  Austin ............................. 204/277
4,176,038  11/1979 Moeglich ........................ 204/277

FOREIGN PATENT DOCUMENTS 55-7319  2/1980 Japan ............................... 204/277
407844   4/1974 U.S.S.R. .
644738   1/1979 U.S.S.R. .

Primary Examiner—Donald R. Valentine
Attorney, Agent, or Firm—Ladas & Parry

[57] ABSTRACT

An apparatus comprises a settling chamber with outlet pipes to discharge purified liquid and sludge and an electrocoagulation chamber installed in the settling chamber and communicating with the latter. The electrocoagulation chamber has an inlet pipe to feed contaminated liquid, an inlet pipe to feed electrolyte, and a system of soluble electrodes disposed below the inlet pipe to feed contaminated liquid. Apertures are provided in the walls of the electrocoagulation chamber along the perimeter thereof below the liquid level in the settling chamber, the apertures receiving the nozzles of injectors which transfer a part of foam from the electrocoagulation chamber to the settling chamber.

6 Claims, 3 Drawing Figures

APPARATUS FOR ELECTROCHEMICAL PURIFICATION OF CONTAMINATED LIQUIDS

This is a continuation of application Ser. No. 221,245 filed Dec. 30, 1980, now abandoned.

BACKGROUND OF THE INVENTION

1. Field of the Invention

The present invention relates to apparatus for purifying contaminated liquids and more particularly to an apparatus for electrochemical purification of contaminated liquids.

The invention may be employed for purifying liquids contaminated with organic substances, mechanical suspensions, surfactancts, and the like.

The invention is particularly useful for purifying liquids contaminated with polymers and petroleum products, such as waste water containing cutting fluids.

2. Description of the Prior Art

Of all the prior art devices for purifying contaminated liquids, the widest and ever increasing application has recently been found by apparatus for electrochemical purification of liquids, in particular those where liquid is purified by the electroflotation and electrocoagulation methods, which is due to their high performance capabilities.

Apparatus are known where the electrochemical liquid purification process is accomplished either in batches, or continuously; the latter appear to be more promising.

A prior art apparatus for electrochemical purification of contaminated liquids (USSR Inventor's Certificate No. 407,844) comprises a settling chamber which houses an electrocoagulation chamber and communicates with the latter. The electrocoagulation chamber has soluble electrodes and an inlet pipe to feed contaminated liquid, disposed under the electrodes. The settling chamber comprises an outlet pipe to discharge purified liquid. In the course of purification, the contaminated liquid with electrolyzing additives (hydrochloric acid, sodium chloride) passes between the soluble electrodes whereto electric current is applied. This brings about the formation of hydroxides of the soluble electrode metal, which coagulate impurities contained in the liquid being purified. From the electrocoagulation chamber, the liquid passes into the settling chamber where sludge separates from the liquid, following which the sludge and the liquid are discharged separately.

Passing between the electrodes, the liquid being purified fouls these, which accelerates passivation of the electrodes and hence increases the power consumption and necessitates frequent cleaning of the electrodes, i.e. eventually reduces the efficiency of the apparatus.

In another prior art apparatus (Japanese Pat. No. 52-14397, published Nov. 30, 1977), the electrocoagulation chamber serves only to produce coagulants, for which purpose a pure electrolyte is fed thereinto, while liquid purification is accomplished in another chamber whereinto the liquid being purified is fed and where the liquid is mixed with the electrolyte containing coagulants and fed from the electrocoagulation chamber.

While greatly diminishing the fouling of the electrode surfaces, such a construction of the apparatus fails fully to exploit the coagulation and flotation capabilities of the electrodes, since when the electrolyte passes from the electrocoagulation chamber to the settling chamber, the coagulants (hydroxides of the soluble electrode metal) and gas bubbles forming on the soluble electrode surface aggregate, which reduces their specific surface and hence impairs their coagulating and flotation capabilities.

The above factors adversely affect the apparatus efficiency, since a considerable part of formed coagulants and gas bubbles take no part in the purification process.

Also known in the art are apparatus wherein contaminated liquid is fed into the electrocoagulation chamber through an inlet pipe disposed above the electrodes, while the electrolyte is passed between the electrodes.

Liquid purification in such apparatus is accomplished with essentially no fouling of the electrodes and a lesser detrioration of the capability of the electrodes to form coagulants and gas bubbles. Hence, a higher efficiency than in the previously described apparatus is ensured. For example, an apparatus for electrochemical purification of contaminated liquids, disclosed in USSR Inventor's Certificate No. 644,738, comprises a settling chamber with an outlet pipe to discharge purified liquid and a tubular electrocoagulation chamber installed in the settling chamber and communicating therewith, at the bottom portion of the settling chamber a system of soluble electrodes is disposed which is provided with an inlet pipe to feed contaminated liquid, disposed above said system of soluble electrodes.

The inlet pipe to feed contaminated liquid should be spaced from the electrodes at such a distance which excludes the possibility of fouling them by impurities contained in contaminated liquid. Thus, when the inlet pipe is of a cylindrical configuration, the distance should be of (1 to 7)d, where d is a diameter of the inlet pipe.

A disadvantage of this apparatus lies in a low purification efficiency and a higher consumption of both soluble electrodes and power, especially in treating heavily contaminated liquids (with an impurity concentration of 2,000 mg/l and higher). Such a liquid is treated at a high current density (1.5 to 2.5 A/dm$^2$); this causes a large amount of foam to be formed (up to 30 to 40% of the volume of the liquid being treated) containing the hydroxide of the soluble electrode metal (10 to 15%), which features a good sorbing and coagulating capability; however, the foamy product in such an apparatus is not used and is discharged from the apparatus as it accumulates therein.

SUMMARY OF THE INVENTION

The principal object of the present invention is to provide an apparatus for electrochemical purification of contaminated liquids, wherein the foamy product is utilized to a larger extent and the specific consumption of the electrode metal is reduced.

Another object of the invention is to raise the efficiency of the apparatus.

Still another object of the invention is to cut down the specific power consumption.

The above-mentioned and other objects of the invention are attained by that in an apparatus for electrochemical purification of contaminated liquids, comprising a settling chamber with outlet pipes to discharge purified liquid and sludge and an electrocoagulation chamber installed in the settling chamber, communicating with the latter, and having an inlet pipe to feed contaminated liquid, an inlet pipe to feed an electrolyte, and a system of soluble electrodes, according to the invention, apertures are provided in the walls of the electrocoagulation chamber along the perimeter thereof and below the liquid level in the settling chamber, the apparatus being further provided with injectors intended to transfer at least some of the foam from the top portion of the electrocoagulation chamber to the top portion of said settling chamber and connected to a compressed gas source, each of the injectors having a pipe to suck the foam and a nozzle received in one of the apertures in the walls of said electrocoagulation chamber.

Such a construction of the apparatus of the invention offers a better utilization of the foamy product which contains a considerable amount of coagulants and thereby ensures a higher efficiency of the apparatus and a lower specific power consumption.

it is advisable that a system of insoluble electrodes, intended to speed up the rise of impurities and coagulants contained in the liquid incoming from the electrocoagulation chamber, be installed in the settling chamber below the apertures in the walls of the electrocoagulation chamber.

BRIEF DESCRIPTION OF THE DRAWINGS

The above-mentioned and other objects and advantages of the present invention will become more fully apparent from the following detailed description of embodiments thereof with reference to the accompanying drawings, in which.

DETAILED DESCRIPTION OF THE INVENTION

Figure 1:
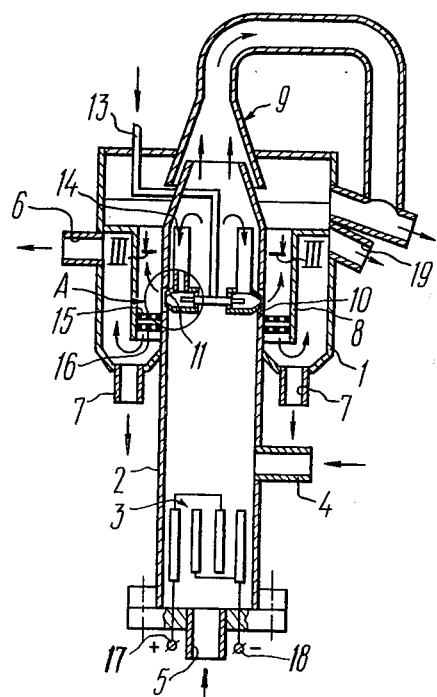
FIG. 1 is a longitudinal sectional view of an apparatus for electrochemical purification of contaminated liquids, constructed in accordance with the present invention.

Referring to FIG. 1, the proposed apparatus for electrochemical purification of contaminated liquids comprises a settling chamber 1 and an electrocoagulation chamber 2 installed in the settling chamber 1. In the embodiment of the invention being described, the electrocoagulation chamber 2 is a vertical tube with an open top end. At the bottom portion of the settling chamber 1 there is disposed a system 3 of soluble electrodes. An inlet pipe 4 disposed above the soluble electrode system 3 is intended to feed contaminated liquid into the electrocoagulation chamber 2, and an inlet pipe 5 disposed under said system 3, to feed the electrolyte thereinto.

An outlet pipe 6 to discharge purified liquid from the apparatus is disposed at the top portion of the settling chamber 1, and an outlet pipe 7 to discharge sludge, at the bottom portion thereof.

A tubular separating partition 8 is installed in the settling chamber 1; the bottom end is spaced from the bottom of the settling chamber to form an annular gap for the purified liquid to flow therethrough. Foam may be removed by the use of a conventional device 9.

In accordance with the invention, apertures 10 are provided in the walls of the electrocoagulation chamber 2 along the perimeter thereof, below the liquid level in the settling chamber 1.

Figure 2:
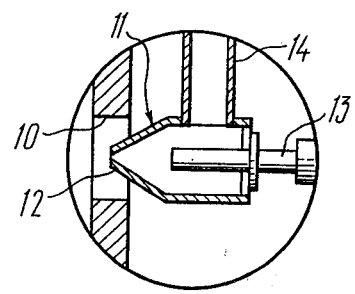
FIG. 2 is an enlarged view of the fragment A in FIG. 1.
Figure 3:
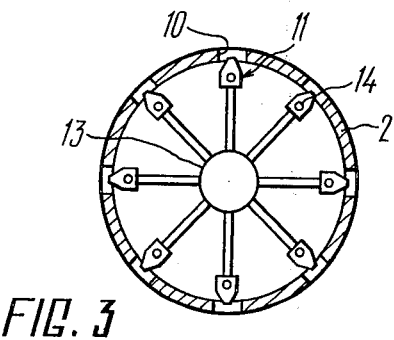
FIG. 3 is an enlarged sectional view of the electrocoagulation chamber, taken along the line III—III in FIG. 1.

The apparatus is provided with air injectors 11 (see also FIGS. 2 and 3) intended to transfer at least a part of foam from the top portion of the electrocoagulation chamber 2 to the top portion of the settling chamber 1. A plurality of the injectors 11 are installed so that a nozzle 12 of each of them is received in one of the apertures 10 (FIG. 3). The injectors 11 (FIGS. 1 and 3) are connected to a compressed gas source (not shown) through a piping 13; it is expedient to use compressed air as the compressed gas. Each of the injectors 11 has an intake pipe to suck foam from the electrocoagulation chamber 2.

As shown in FIG. 1, in the preferred embodiment of the invention a system of insoluble electrodes 15, 16 is installed in the settling chamber 1 below the apertures 10 in the walls of the electrocoagulation chamber 2. The electrode 15 is connected to a positive terminal 17, and the electrode 16, to a negative terminal 18 of a direct current source (the current source and connection are not shown). Each of the electrodes 15, 16 may have the form of a perforated stainless-steel disk. The spacing between the electrodes 15 and 16 is 10 to 20 mm. The polarity of connecting the electrodes, shown in the drawing, is preferable.

The apparatus has also an outlet pipe 19 to discharge non-coagulated aggregates of impurities and hydroxides from the settling chamber 1.

The apparatus functions as follows. Before treating the liquid, the electrocoagulation and settling chambers are filled with a pure electrolyte (industrial water with small additions of HCl or NaCl), following which voltage is applied to the soluble electrodes 3 and the insoluble electrodes 15, 16, and after some interval (25 to 30 s) contaminated liquid feed into the apparatus through the inlet pipe 4 is started; the liquid enters the electrocoagulation chamber 2 and fills the space thereof. Simultaneously with the contaminated liquid feed, the compressed air delivery through the injectors 11 is turned on.

In the course of the anodic dissolution of the soluble electrodes 3, metal hydroxides are formed and gas (hydrogen) bubbles evolve at the electrodes 3. The metal hydroxides are carried up by the gas bubbles up the electrocoagulation chamber 2 and, encountering a contaminated liquid stream, coagulate the impurities present in the liquid. The liquid thus treated, together with the aggregates of coagulated impurities and hydroxides, present in the liquid, passes through the annular gaps defined between the nozzles 12 and the walls of the apertures 10 into the centre zone of the settling chamber where the action of the compressed air jets emerging from the nozzles 12 causes the liquid to uniformly distribute over the entire perimeter of the settling chamber. The foam accumulating in the top portion of the apparatus and containing active hydroxides is via pipes 14 and nozzles 12 fed into the settling chamber concurrently with feeding the compressed air. Mixing with the flows of liquid passing through the annular gaps between the nozzles 12 and the walls of the apertures 10, the foam enhances both the coagulation of impurities and utilization of the hydroxides.

Non-coagulated aggregates of impurities and hydroxides, present in the liquid, when passing through the electrode system 3, are carried up by gas bubbles evolving at the electrodes and, as they accumulate, removed through the outlet pipe 19. The purified liquid passes a labyrinth of the settler formed by the vertical partition 8 and is discharged through the outlet pipe 6. A part of the liquid can be recirculated to the bottom section of the electrocoagulation chamber 2.

The foam accumulating in the top portion of the apparatus is through an intake removed with the aid of the device 9. The sludge built up in the settler in the course of operation is discharged through the outlet pipe 7.

Testing the above-described apparatus has shown that, owing to a better utilization of the electrode dissolution products and of the coagulating capability of the foam forming in the course of the electrolytical treatment of liquid, the efficiency of the purification process rose by 15 to 35% (greater values are characteristic for liquids with higher concentration of impurities), the power consumption decreased by a factor of 1.25 to 1.4, and the electrode consumption, of 1.3 to 1.4. The overall degree of purification was of 98.9 to 99.4%.

In addition, the introduction of liquid into the settler by the method of spraying the liquid by compressed air creates favourable conditions for coagulation of the remaining impurities, which allows the power consumption by the insoluble electrode system to be reduced by 1.8 to 2.0 times.

It will be understood that the above-described embodiment of the invention is given for illustration purposes only and that various modifications may be made in the invention within the scope of the appended claims.

What is claimed is:

1. An apparatus for electrochemical purification of contaminated liquids comprising:
    a settling chamber having an outlet pipe for purified liquid and an outlet pipe for discharge of sludge;
    an electrocoagulation chamber communicating with said settling chamber at a level below the purified liquid outlet thereof, said electrocoagulation chamber having a system of soluble electrodes mounted therein, an inlet pipe for contaminated liquids disposed above said electrodes and an inlet pipe for electrolyte disposed below said inlet for contaminated liquids;
    and compressed air jet pump means for drawing froth from the upper portion of said electrocoagulation chamber into said settling chamber.

2. An apparatus according to claim 1, wherein said inlet for electrolyte is disposed below said soluble electrode.

3. An apparatus according to claim 2 wherein there are mounted insoluble electrodes in the settling chamber in the flow path to be taken by material passing into said settling chamber in the flow path to be taken by material passing into said settling chamber prior to arrival at an outlet.

4. An apparatus according to claim 3 wherein said insoluble electrodes are mounted below the level at which there is communication between the settling chamber and the electrocoagulation chamber.

5. An apparatus according to claim 1 wherein there are mounted insoluble electrodes in the settling chamber in the flow path to be taken by material passing into said settling chamber prior to arrival at an outlet.

6. An apparatus according to claim 5 wherein said insoluble electrodes are mounted below the level at which there is communication between the settling chamber and the electrocoagulation chamber.

* * * * *